United States Patent [19]
Rower

[11] 3,799,274
[45] Mar. 26, 1974

[54] MOLDBOARD PLOW

[76] Inventor: Ernst Rower, No. 142, Kreis Verden/Aller, 3091 Blender, Germany

[22] Filed: Oct. 12, 1970

[21] Appl. No.: 79,619

[30] Foreign Application Priority Data
Oct. 14, 1969 Germany............................ 1951626

[52] U.S. Cl. ............................................. 172/759
[51] Int. Cl. ............................................. A01b 15/00
[58] Field of Search............ 172/722, 754, 757–761, 172/765, 769–771

[56] References Cited
UNITED STATES PATENTS

| | | | |
|---|---|---|---|
| 1,091,920 | 3/1914 | Faulkner | 172/759 |
| 833,789 | 10/1906 | Machia | 172/769 |
| 644,980 | 3/1900 | Gurney | 172/754 |
| 471,420 | 3/1892 | Edwards | 172/759 |
| 3,136,374 | 6/1964 | Laster | 172/759 |
| 991,810 | 5/1911 | Whiting | 172/760 |
| 614,067 | 11/1898 | Spicer | 172/761 |
| 3,050,136 | 8/1962 | Rayder | 172/759 |

FOREIGN PATENTS OR APPLICATIONS
678,970   7/1939   Germany ............... 172/759

*Primary Examiner*—Robert E. Bagwill
*Assistant Examiner*—R. T. Rader

[57] ABSTRACT

A plow having a body structure including a share and a rear moldboard carried by the body structure and having a lower edge joining a rearward part of the share, is provided with a second moldboard having a lower edge joining a forward part of the share for the purpose of effectively covering weeds, stubble, straw and the like material. The second forwardly disposed moldboard includes an arcuate channel having a generally vertical section and an arcuate section extending forwardly for directing material received by the second moldboard into the previous furrow.

11 Claims, 5 Drawing Figures

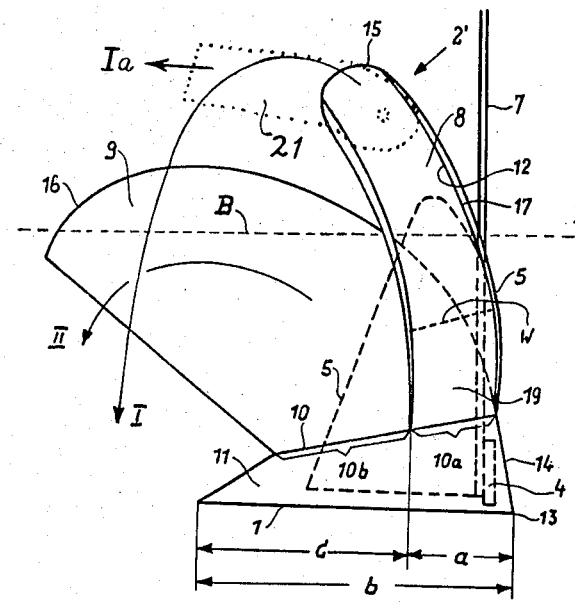
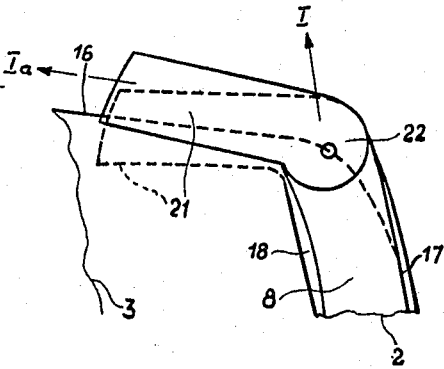
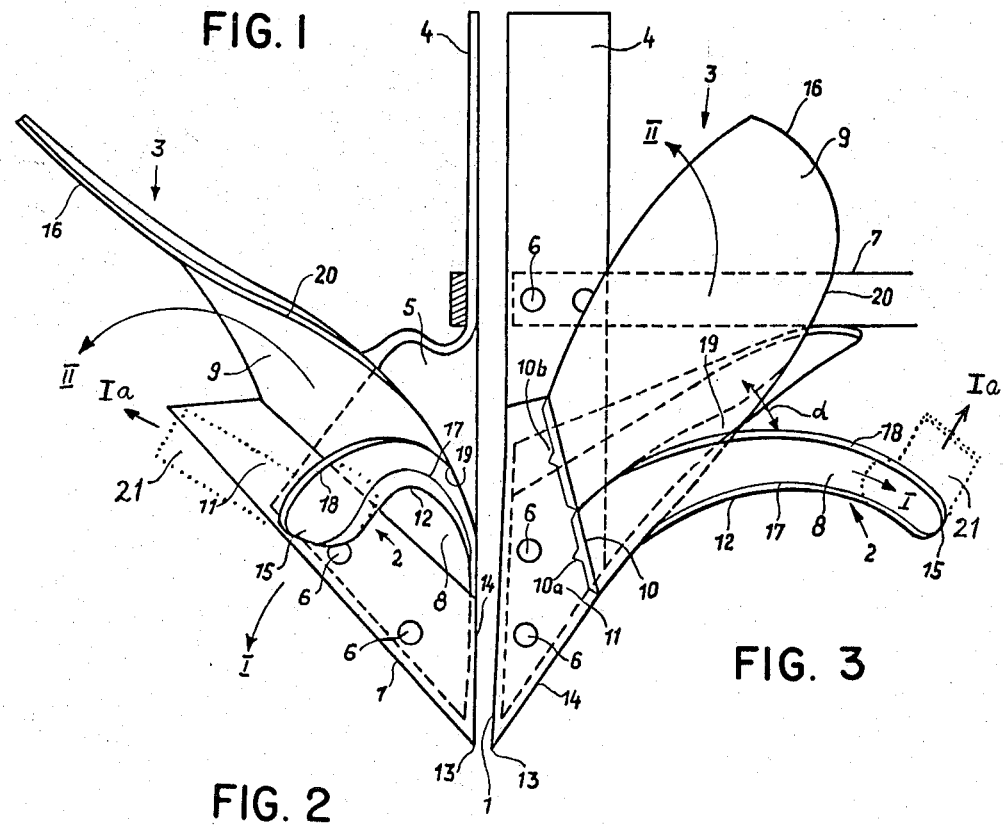
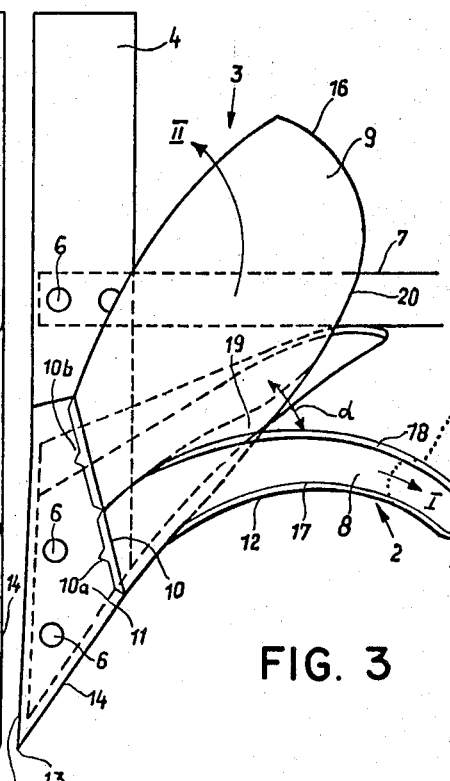
FIG. 1
FIG. 4
FIG. 2
FIG. 3

MOLDBOARD PLOW

The invention relates to improvements in plows of the moldboard types including a front moldboard of greater steepness and a rear moldboard of minor steepness for separate turning over of first soil from an outer and subsequently from a joining inner strip in front of the furrow during the plowing.

In the known moldboard plows the front moldboard just as the rear moldboard is formed as a soil guide surface at an oblique angle with the direction of plowing in such a manner that the soil engaged by the plowshare together with weeds, stubble, straw and dung within and upon it will flow along the guide surfaces sidewards and will leave the engaged guide surfaces at the rear lateral edges of each moldboard respectively.

Consequently the material engaged by the front moldboard will be turned over upon the surface of the soil of the inner strip engaged already but not yet turned over by the rear moldboard and then once more has to be lifted together with the material of the inner strip and turned over into the last finished lateral furrow (U.S. Pat. No. 3 050 137). This has the disadvantage that dung, weeds, straw and similar fibrous material is not well covered by soil but will remain substantially on the surface of the plowed field.

It is possible to improve the process of plowing under fibrous materials by using in a known manner a plow with a single moldboard in combination with a separate jointer which is connected to the beam of the plow structure by help of a shank in advance of the plow. Such a separate shank moving in advance of the plow is unsatisfying because dung, straw and weeds will cling to the shank and impair the process of plowing by frequent cloggings. For this reason the above described arrangement of a front moldboard in connection with a rear main moldboard had been proposed which, however, could give no effective solution of the problem.

The present invention is based on the problem of providing a moldboard plow of the kind described above, which enables a good flow of the engaged material over the rear surface and a positive unobjectionable bringing of straw, weeds, stubble, dung and similar fibrous material into the lateral furrow before the bulk of clear soil is turned over thus completely covering said fibrous material.

In the solution of this problem, the invention is based on the recognition that for reasons of collision it is not practicable to put a normal sickle-shaped jointer immediately at the moldboard of a normal moldboard plow and that, therefore, at least all fibrous material from an outer strip in front of the furrow in the making must be brought into the lateral furrow in a manner different from a lateral discharge like that effected by the rear moldboard.

Proceeding on the above consideration a satisfying solution of the present problem has been achieved according to the present invention. The front moldboard running in advance is made in the form of a throw-out channel ascending along a vertical curve running from its lower joining end at first backwards and finally hanging over forwardly thus throwing engaged material (soil, dung, weeds, stubble, straw and other fibrous material) from said outer strip over the inner strip already engaged but not yet turned over by the following rear moldboard into the lateral furrow. It appeared that normal velocities of plowing are quite sufficient to give the material engaged by the throw out channel that acceleration which is necessary to throw it from the outer beyond the inner yet unplowed strip into the lateral furrow. Moreover a positively actuated separation of material from said two strips is obtained by the different methods of operation of the front and rear moldboard respectively thereby improving the friability of the broken soil and facilitating its subsequent cultivation of the field.

The throw-out channel preferably is ascending higher than the rear moldboard to secure a high throwing range. A wiper substantially extending horizontally backwards and forwardly hanging over may be jointed laterally to the upper portion of the inner side edge of the throw-out channel. Loose material as straw and dung lying upon the yet unplowed inner strip is shifted by such a wiper into the lateral furrow. As the wiper is connected to the upper most advanced portion of the throw-out channel it cannot cause interference with the flow of material along the rear moldboard.

In order to make the invention clearly understood, reference will now be made to the accompanying drawings which are given by way of example and in which:

FIG. 1 is a front elevation of a plow, according to the invention,

FIG. 2 is a top view of the same,

FIG. 3 is a side elevation to FIG. 2,

FIG. 4 is a fragmentary view showing the guide channel and wiper, and

FIG. 5 is a cross-sectional view taken along line 5—5 of FIG. 1.

Referring in detail to the drawings, a moldboard plow provided with the invention consists of a plowshare 1, a front moldboard 2, a rear moldboard 3, a landslide 4, a carrier 5 and a shank 7 connected to a plow beam (not shown in the drawing). The plowshare 1 and the moldboards 2,3 are preferably detachably connected to the carrier 5 by screws with flush heads 6. The moldboards 2,3 have soil guide surfaces 8,9 connected in sections 10a, 10b to the upper edge 10 of plowshare 1 and forming together with said guide surface 11 smooth continuous surfaces from the bottom edge of the share to the upper edges 15,16 of the moldboards. The fore or leading edge 12 of the front moldboard 2 constitutes a continuation of the leading edge 14 of the share 1, extending from the point 13 to the upper edge 10 of the share 1.

The front moldboard 2 is made in the form of a throw-out channel ascending from section 10a at first backwards with a steepness higher and growing faster than that of the rear moldboard 3 and finally with its upper portion hanging over forwardly. The guide surface 8 of the throw-out channel 2 not only has a much greater longitudinal curvature, it is also provided with a transverse curvature forming traversing stops 17,18 for the engaged material which from a longitudinal through-shaped channel in which the once engaged material is positively catched and guided to the upper output edge 15 from where it is thrown in direction I of an acute angle of for instance 30° towards ahead into the lateral furrow. The inside traversing stop 18 is especially important to withhold the engaged material within the throw-out channel in spite of inward directed transverse force components resulting from a little inclination of the guide surface 8 of the throw-out channel 2 towards the lateral furrow which inclination is much less than the inclination of the rear moldboard 3.

The transverse inclination of the guide surface 8 of the throw-out channel 2 is only as high as necessary to guide the engaged material in longitudinal direction of this channel to the output edge 15 which is situated approximately in the middle of the lateral extension b of the share 1, which extension b corresponds to the maximal breadth of the furrows. Material from an outer strip a of the furrow just being plowed is lifted by the front section of the share. A lower part of this material is deflected sidewards by the guide surface 11 of the share 1 before reaching the entrance of the throw-out channel in the region of section 10a. Another part of this material and especially all material from an upper surface soil will be engaged by the throw-out channel and will be thrown in direction I over the joining inner strip b engaged but not yet turned over by the following rear moldboard 3 into the lateral furrow. Only then the material engaged by the rear moldboard 3 is turned over in direction I completely covering all material thrown over in advance into the lateral furrow from the strip a. The throw-out channel 2 as shown in the drawing consists of a plate which is detachably secured upon the front portion 19 of the rear moldboard 3 extending up to the upper portion of the share. This construction may be preferred because it offers the possibility of a change from a known moldboard plow with a single moldboard 3 to a plow with a front and rear moldboard according to the invention and vice versa.

In complete new plows it may be preferred to attach both moldboards 2 and 3 directly upon a common carrier. Then the front edge 20 of the rear moldboard 3 would have a run as indicated by the plotted line 20 in FIG. 3.

If a plow according to the invention shall be used especially for deep plowing with the surface of the field for instance at B then it is advisable to arrange the lower end of the throw-out channel not at the upper edge 10 but a distance above this edge as is indicated by dotted line w in FIG. 1. In any case the entrance of the throw-out channel 2 shall be a distance below the top layer of the field which possibly may be interspersed by weeds or other fibrous material to be thrown in the lateral furrow.

The breadth of the throw-out channel 2 may vary in a wide range and will preferably chosen to be ⅓ of the maximal breadth b of the furrow.

Moreover it may be advisable, especially in the case of high quantities of loose fibrous material at the surface of the field, to provide a wiper 21 (FIG. 4) joined lateraly to the upper portion of the inner edge 18 of the throw-out channel 2. This wiper 21 is arranged substantially horizontally, extending backwards and hanging over forwardly as is shown in FIGS. 1 to 3 by dotted lines.

However, in FIGS. 1 to 3 the rear moldboard 3 must be much greater in this case in order to obtain a relative position of the wiper 21 and rear moldboard 3 like that shown in FIG. 4. The lower edge of the wiper 21 is arranged a distance as small as possible above the surface B of the field so that loose fibrous material lying upon the inner strip b will be engaged by the wiper 21 and shifted in direction Ia across the rear edge situated approximately in the same line as the inner end of the plowshare.

The wiper 21 is swingable and lockable about an axle 22 at the throw-out channel 2, so that the wiper 21 is adjustable in height. The wiper 21 would be formed and connected to the throw-out channel 2 in such a manner that it can be taken away and can be attached without changing the function of the throw-out channel. Also the throw-out channel 2 could extend higher than the wiper 21.

I claim:

1. A plow comprising:
   a base structure including a share having a forward part and a rearward part;
   a rear moldboard carried by the base structure, having a lower end joining the rearward part of said share and being directed rearwardly;
   and a forward moldboard having the same width along its length and having a lower edge joining the forward part of said share;
   said forward moldboard defining an elongated channel having elongated lateral stops for guiding the material;
   said channel having an arcutate bend along its length and comprising a number of contiguous sections including;
   a first section extending from said lower edge at the share and inclined rearwardly like said share and rear moldboard,
   a second section extending from said first section and directed forwardly away from said rear moldboard,
   and a third or top section defining an upper end having a width the same as the length of said lower edge and that is disposed in its entirety forward of said second section,
   said upper end extending forwardly sufficiently to extend over said lower edge.

2. The plow of claim 1 wherein said channel has a slightly arcuate cross-section.

3. The plow of claim 2 wherein said lateral stops extend angularly from said channel and in part define said channel.

4. The plow of claim 2 wherein said lateral stops extend along the entire length of said channel.

5. The plow of claim 1 wherein said upper end terminates at a location lying approximately above the middle of the share.

6. The plow of claim 1 wherein said second moldboard extends backwardly at a steeper incline than said first moldboard 7. The plow of claim 1 wherein said channel has a width of approximately one-third the width of the share.

8. The plow of claim 1 wherein said channel is attached to said first moldboard.

9. The plow of claim 1 comprising a wiper joined to the arcuate section of the channel and being arranged essentially horizontally.

10. The plow of claim 9 wherein said wiper extends sidewards approximately to the end of the share.

11. The plow of claim 9 wherein said wiper is swingable and lockable about an axle.

* * * * *

UNITED STATES PATENT OFFICE
CERTIFICATE OF CORRECTION

Patent No. 3,799,274    Dated March 26, 1974

Inventor(s) Ernest Rower

It is certified that error appears in the above-identified patent and that said Letters Patent are hereby corrected as shown below:

Fig. 5 should appear as part of Letter Patent No. 3,799,274

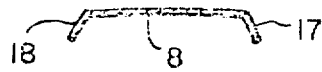

FIG. 5

Signed and Sealed this thirteenth Day of April 1976

[SEAL]

Attest:

RUTH C. MASON
*Attesting Officer*

C. MARSHALL DANN
*Commissioner of Patents and Trademarks*